US010742908B2

(12) United States Patent
Pichette et al.

(10) Patent No.: US 10,742,908 B2
(45) Date of Patent: Aug. 11, 2020

(54) METHOD AND A DEVICE FOR ACQUIRING AN IMAGE HAVING TWO-DIMENSIONAL SPATIAL RESOLUTION AND SPECTRAL RESOLUTION

(71) Applicant: IMEC VZW, Leuven (BE)

(72) Inventors: Julien Pichette, Woluwe-Saint-Lambert (BE); Wouter Charle, Vissenaken (BE)

(73) Assignee: Imec VZW, Leuven (BE)

( * ) Notice: Subject to any disclaimer, the term of this patent is extended or adjusted under 35 U.S.C. 154(b) by 0 days.

(21) Appl. No.: 15/648,432

(22) Filed: Jul. 12, 2017

(65) Prior Publication Data

US 2018/0020170 A1   Jan. 18, 2018

(30) Foreign Application Priority Data

Jul. 15, 2016  (EP) .................................... 16179722

(51) Int. Cl.
| | |
|---|---|
| *H04N 5/349* | (2011.01) |
| *H04N 5/33* | (2006.01) |
| *H04N 1/191* | (2006.01) |
| *H04N 5/225* | (2006.01) |
| *H04N 5/265* | (2006.01) |

(52) U.S. Cl.
CPC ............. *H04N 5/349* (2013.01); *H04N 1/191* (2013.01); *H04N 5/2256* (2013.01); *H04N 5/265* (2013.01); *H04N 5/332* (2013.01); *H04N 2209/047* (2013.01)

(58) Field of Classification Search
CPC ............................... H04N 5/349; G01J 3/2823
USPC ......................................................... 358/474
See application file for complete search history.

(56) References Cited

U.S. PATENT DOCUMENTS

| | | | |
|---|---|---|---|
| 2007/0223058 A1* | 9/2007 | Cotte ........................ | G01J 3/46 358/474 |
| 2010/0296141 A1* | 11/2010 | Maruyama ......... | H04N 1/02865 358/509 |
| 2014/0022425 A1 | 1/2014 | Wang et al. | |

FOREIGN PATENT DOCUMENTS

EP        2 980 625 A1    2/2016

OTHER PUBLICATIONS

European Search Report, European Patent Application No. 16179722. 0, dated Jan. 19, 2017, pp. 7 pages.

* cited by examiner

*Primary Examiner* — Jefferey F Harold
*Assistant Examiner* — Sihar A Karwan
(74) *Attorney, Agent, or Firm* — McDonnell Boehnen Hulbert & Berghoff LLP

(57) ABSTRACT

The present disclosure relates to devices and methods for acquiring an image having two-dimensional spatial resolution and spectral resolution. An example method comprises: acquiring a frame using rows of photo-sensitive areas on a sensor surface detecting incident light from an object imaged by an optical system onto an image plane, wherein rows of photo-sensitive areas are arranged to receive different wavelengths; moving the sensor surface in a direction perpendicular to a longitudinal direction of the rows; repeating the acquiring and moving for acquiring a plurality of frames recording different spectral information for respective positions on the object; and combining information from the plurality of frames to form multiple channels of an image, wherein each channel is formed based on detected light in respective rows and represent a two-dimensional image of the object for a different wavelength.

9 Claims, 5 Drawing Sheets

METHOD AND A DEVICE FOR ACQUIRING AN IMAGE HAVING TWO-DIMENSIONAL SPATIAL RESOLUTION AND SPECTRAL RESOLUTION

CROSS-REFERENCE TO RELATED APPLICATIONS

The present application is a non-provisional patent application claiming priority to European Patent Application No. 16179722.0, filed Jul. 15, 2016, the contents of which are hereby incorporated by reference.

FIELD OF THE DISCLOSURE

The present disclosure relates to a method and a device for acquiring an image, wherein the image has two-dimensional spatial resolution and spectral resolution.

BACKGROUND

Line-scan image capturing devices are often used when an image of an object is to be acquired with high spectral resolution. Line-scan image capturing devices may typically be used in remote sensing or imaging of objects on a conveyor belt, wherein the object moves in relation to the image sensor.

A line-scan image capturing device may image a particular part of an object onto a row of pixels on an image sensor. As the object is moved, the particular part of the object is imaged onto another row of pixels on the image sensor. Different rows of pixels may be sensitive to different wavelengths of light, such that, as the object is moved over the sensor area, an image with high spectral and spatial resolution may be obtained.

Using a line-scan image capturing device may be particularly useful in specific applications, e.g. in remote sensing in light-starved situations, such as a camera installed in an aerial vehicle which monitors the ground below, and in imaging of objects on a conveyor belt. In such applications, the recording of received light in image rows may be synchronized with movement speed of the object on the sensor surface.

Imaging of objects using a line-scan image capturing device is not very fast, as the object needs to be moved across the sensor surface in order for a full spectrally resolved image to be acquired. Also, the imaging is adapted to movement of an object in relation to the image capturing device.

It would be desirable to extend usage of the concept of line-scan imaging to other applications.

SUMMARY

The example embodiments described herein provide a method and device facilitating capture of an image having two-dimensional spatial resolution and spectral resolution. The example embodiments allow for acquisition of hyperspectral images in a fast manner, using a compact camera.

According to a first aspect of the disclosure, there is provided a method for acquiring an image having two-dimensional spatial resolution and spectral resolution, the method comprising: acquiring a frame using rows of photo-sensitive areas on at least one sensor surface, which at least one sensor surface is arranged in relation to at least one optical system in an image plane defined by the at least one optical system, wherein the photo-sensitive areas are arranged to detect incident light from an object imaged by the at least one optical system onto the image plane and rows of photo-sensitive areas are arranged to receive different wavelengths of light; moving the at least one sensor surface in the image plane in a direction perpendicular to a longitudinal direction of the rows of photo-sensitive areas; repeating the acquiring for acquiring a plurality of frames using different positions of the at least one sensor surface in relation to the at least one optical system for recording different spectral information for respective positions on the object; and combining information from the plurality of frames to form multiple channels of an image, wherein each channel is formed based on detected light in respective rows of photo-sensitive areas and represent a two-dimensional image of the object for a different wavelength.

According to a second aspect of the disclosure, there is provided a device for acquiring an image having two-dimensional spatial resolution and spectral resolution, the device comprising: at least one optical system, wherein each optical system of the at least one optical system is configured to define an image plane and direct light from an object towards the image plane; at least one sensor surface comprising photo-sensitive areas for detecting incident light, wherein rows of photo-sensitive areas are arranged to receive different wavelengths of light; a translator, wherein the translator is arranged to carry the at least one sensor surface for moving the at least one sensor surface in the image plane in a direction perpendicular to a longitudinal direction of the rows of photo-sensitive areas; and the translator being arranged to be controlled for synchronizing movement of the sensor surface with acquiring of a plurality of frames, wherein a frame in the plurality of frames is acquired by arranging a sub-set of the rows of photo-sensitive areas in the image plane to receive incident light from the at least one optical system.

According to the disclosure, at least one sensor surface may be translated in relation to at least one optical system, wherein each optical system of the at least one optical system defines an image plane. For brevity and simplicity, the relation between the at least one sensor surface and the at least one optical system will mainly be made in relation to a single sensor surface and a single optical system, although it should be realized that a plurality of sensor surfaces and a plurality of optical systems may be used, as also further described below. Also, the terms "a sensor surface" and "at least one sensor surface" as well as the terms "an optical system" and "at least one optical system" may be used interchangeably.

The sensor surface may be internally moved behind the optical system, such that an image plane defined by the optical system may be scanned by the sensor surface. This implies that a static scene may be imaged with high accuracy, as the image may be acquired with a spectral resolution by different rows of photo-sensitive areas of the sensor surface acquiring different wavelengths of light and the sensor surface is moved such that spectrally resolved information may be assigned to spatial positions on the object. There is no need for the object to be moved in relation to the optical system in order to acquire the image with high accuracy.

Further, the example embodiments enable acquiring of an image using a compact imaging set-up. There is no need for complex components in the optical system and the optical system does not need to be changed during acquiring of an image. For instance, there is no need to use e.g. gratings for spectrally resolving received light and which may need to be movable for directing light of a specific wavelength to different rows of the photo-sensitive areas.

Also, thanks to the sensor surface being moved in relation to the optical system, light of different wavelengths may be acquired with a constant relationship between the object and an image plane. This implies that no imaging artefacts may be introduced by changes to the optical system. Further, imaging artefacts at edges of the optical system may also be avoided.

It should be realized that the acquiring of a frame and moving of the at least one sensor surface need to be alternately performed. On the contrary, moving of the at least one sensor surface may be continuously performed during a time period in which a plurality of frames are acquired. For instance, the acquiring of a frame may be triggered at a time when the continuously moved at least one sensor surface is in a desired position. If an exposure time used in acquiring a frame is relatively short compared to a speed of movement of the at least one sensor, the acquired frame will not be affected by a movement blur. However, the acquiring and moving may alternatively be alternately performed in a repetitive manner, wherein the moving of the at least one sensor surface is temporarily stopped during acquiring of a frame.

Each row of photo-sensitive areas on the sensor surface may be arranged to detect light of a pre-selected range of wavelengths of light. Thus, all photo-sensitive areas in a row may be arranged to receive the same pre-selected range of wavelengths of light.

The pre-selected range of wavelengths of light may be different among each row of photo-sensitive areas. Thus, each row of photo-sensitive areas may provide specific spectral information in the acquired image such that the number of channels of the image equals the number of rows on the sensor surface.

A total movement of the sensor surface between a first frame and a last frame to be included may be at least equal to a combined size of the plurality of rows of photo-sensitive areas of the sensor surface. This implies that the sensor surface may be moved in relation to the optical system, such that each channel of the image may provide information relating to the same two-dimensional part of the object. A magnitude of the total movement may be dependent on the number of rows per wavelength band and a size of the acquired frames.

According to an embodiment, rows of photo-sensitive areas are arranged in wavelength bands, each wavelength band comprising a plurality of rows arranged to receive same wavelengths of light. The rows in a wavelength band may further be arranged to receive different pre-selected wavelengths, such that the number of channels of an acquired image equals the number of wavelength bands on the sensor surface.

According to an embodiment of the method, moving the at least one sensor surface comprises translating the at least one sensor surface a distance corresponding to a height of the wavelength band. This implies that the wavelength band will image adjacent positions on the object in two subsequent frames. Hence, each channel may be formed based on as few frames as possible.

According to another embodiment, moving the at least one sensor surface comprises translating the at least one sensor surface a distance corresponding to a height of an integer number of photo-sensitive areas, wherein the integer number is less than a number of rows in the wavelength band. Thus, the same position on the object may be imaged onto the same wavelength band in subsequent frames. This provides a possibility to selectively use information from several frames in order to improve spectral information for a spatial position on the object.

According to an embodiment, a spatial position in a channel is based on information for a single wavelength band acquired in more than one frame. For instance, an average of the detected incident light in the plurality of frames may be used. However, other combinations are possible, such as using a median value, minimum value, maximum value or a percentile value.

According to an embodiment, the combining of information from the plurality of frames disregards information obtained at edge rows in the wavelength band. Pixels at an edge of a wavelength band may suffer from cross-talk with an adjacent wavelength band. Thus, by disregarding edge rows, the risk of cross-talk between wavelength bands may be avoided.

According to an embodiment, the object is static during acquiring of the plurality of frames. Thanks to the object being static, the object is imaged in the same way onto the image plane during acquiring of the plurality of frames and, even though the frames are not acquired in the same instant of time, there is no motion blur in the image.

According to another embodiment, the method further comprises moving a camera comprising the at least one optical system and the at least one sensor surface in concert with a movement of the object such that a relation between the object and the at least one optical system is static during acquiring of the plurality of frames. This implies that the object, even though it is moving, may still be imaged in the same way onto the image plane during acquiring of the plurality of frames.

According to an embodiment of the device, the device may comprise a control unit for synchronizing movement of the at least one sensor surface with acquiring of the plurality of frames. The control unit may be arranged to alternate movement of the at least one sensor surface with acquiring of a frame. Alternatively, the control unit may be arranged to move the at least one sensor surface with a constant speed and synchronize acquiring of frames with the at least one sensor surface being moved a distance corresponding to a height of an integer number of pixels.

The control unit may be embedded into the device and may e.g. be implemented in a processing unit of the device. However, according to an alternative, the control unit may be external to the device. In such case, the device may comprise a receiver, which is arranged to receive and forward control signals for synchronizing movement of the sensor surface with acquiring of the plurality of frames.

According to an embodiment, the device further comprises a communication unit for transmitting information in acquired frames to an external unit. Thus, the acquired frames may be transmitted to an external unit, which may combine the acquired frames into an image having two-dimensional spatial resolution and spectral resolution. This implies that the device need not include a processing unit for enabling the combining, which may be beneficial if e.g. size requirements on the device are very harsh. This could for instance be the case if the device is to be used for endoscopic imaging.

According to another embodiment, the device further comprises a combining unit for combining information from a plurality of frames to form multiple channels of an image, wherein each channel is formed based on detected light in respective rows of photo-sensitive areas and represents a two-dimensional image of the object for a different wavelength. This implies that the device may be compact and that the image may be formed within the device, so that there is no necessity to connect the device to other components for forming the image.

According to an embodiment, the device further comprises at least one filter which is arranged in relation to the at least one sensor surface for defining wavelength bands, each wavelength band comprising a plurality of rows of photo-sensitive areas arranged to receive same wavelengths of light. The filter may ensure that the desired wavelengths are received by the respective rows of photo-sensitive areas. Further, using a filter may ensure that a row of photo-sensitive areas receives the same wavelengths in each acquired frame.

According to an embodiment, a number of the plurality of rows is different for different wavelength bands. This implies that channels representing different wavelength bands may be acquired using different set-ups. For instance, this may be used to adjust a signal-to-noise ratio depending on a quantum efficiency of the sensor and a filter response. Also, this may be used to give different weight to different wavelength bands, e.g. based on expected different amounts of incident light in different wavelengths.

According to an embodiment, a set of adjacent wavelength bands define a spectral range of an image, and wherein the at least one sensor surface comprises a plurality of sets of wavelength bands repeated on the at least one sensor surface. This implies that each wavelength band within a set of wavelength bands may be arranged to include fewer rows. Thus, the sensor surface may need to be translated a shorter distance in order to obtain information of a full spectral resolution. Further, when a current image is being acquired, frames may include information of wavelength bands of a subsequent image, such that information for a subsequent image may be acquired simultaneously with the current image.

According to an embodiment, the sub-set of the rows of photo-sensitive areas for acquiring a frame are arranged in a position in the image plane co-centric with an image circle defined by the optical system. The optical system may image an object onto an image circle and positions being imaged closest to a center position of the image circle may be least affected by any edge artefacts in the optical system. By the sub-set of rows on the sensor surface that are used in acquiring a frame being arranged in a position defined co-centric with the image circle, it is ensured that the acquired information in each frame has no or limited imaging artefacts from the optical system.

According to an embodiment, the device comprises a plurality of sensor surfaces, wherein the plurality of sensor surfaces are arranged in a common sensor plane and the translator is arranged to carry the common sensor plane including the plurality of sensor surfaces. This implies that the device may comprise a plurality of sensor surfaces which may each be adapted for detection of specific range of wavelengths. Thus, the device may for instance comprise a first sensor surface adapted for ultraviolet light, a second sensor surface adapted for visible and near-infrared light, and a third sensor surface adapted for short-wave infrared light. By scanning all these sensor surfaces over an image circle defined by an optical system, an object may be imaged with a spectral resolution spanning over a broad range of wavelengths. Thanks to the use of a plurality of sensor surfaces, each sensor surface may be specifically adapted for detection of light within a specific range of wavelengths.

According to an embodiment, the device comprises a plurality of optical systems, wherein each optical system in the plurality of optical systems is arranged to define an image circle on an image plane and wherein the plurality of image circles are defined on a common image plane. A plurality of optical systems may provide different optical configurations (e.g. aperture, focal length, optical filters) such that a sensor surface when scanned over different image circles may obtain different information. The plurality of optical systems may be arranged in a relationship to each other, such that the image circles are defined on a common image plane, whereby the translator may be arranged to move the at least one sensor surface in a planar movement for scanning the at least one sensor surface over the plurality of image circles.

According to an embodiment, the at least one sensor surface is tilted in relation to a direction of movement of the at least one sensor surface by the translator carrying the at least one sensor surface. This implies that different rows of photo-sensitive areas on a sensor surface will be arranged at different distances from the optical system when arranged in an image circle defined by the optical system. This could be used for handling chromatic lens aberrations in the optical system, such that the respective rows of photo-sensitive areas will be arranged in a true focal plane for the respective wavelength, when arranged in the image circle defined by the optical system.

According to an embodiment, the device is arranged to acquire a first set of frames for forming a first image having two-dimensional spatial resolution and spectral resolution while moving the translator in a first direction and acquire a second set of frames for forming a second image having two-dimensional spatial resolution and spectral resolution while moving the translator in a second direction opposite to the first direction. This implies that the translator need not move the sensor surface to an origin position after each scan in order to prepare for acquiring of a next image. Rather, images may be acquired as the sensor surface is moved back and forth in relation to the optical system. Naturally, the information relating to specific wavelengths will be acquired in an opposite order when the translator is moved in the second direction compared to when the translator is moved in the first direction.

According to an embodiment, the device further comprises an illumination source, wherein the illumination source is controllable for controlling a spectral profile of illuminated light. A control unit may thus control the illumination source such that frames and/or images may be obtained with desired illumination.

According to an embodiment, the illumination source may be controlled to match wavelength bands being arranged in the image plane to receive incident light from the optical system. Thus, the spectral profile of the illumination source may be varied during a scan of the rows of photo-sensitive areas over the image plane. The illumination source may thus e.g. match the quantum efficiency of each photo-sensitive area and the spectral range of each photo-sensitive area.

According to another embodiment, the illumination source may be controlled for respective images such that a specific image may be obtained under specific illumination. This implies that a plurality of images may be obtained under different illuminations providing different information of an object to be imaged.

According to an embodiment, the translator is a piezo-electric translation stage for accurately moving the sensor surface. This implies that the translator may be implemented as a small component which may accurately control movement of the sensor surface.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present disclosure will now be described more fully hereinafter with reference to the accompanying drawings, in which example embodiments are shown. This disclosure may, however, be embodied in many different forms and should not be construed as limited to the embodiments set forth herein; rather, these embodiments are provided for thoroughness and completeness, and fully convey the scope of the disclosure to the skilled person.

Figure 1:
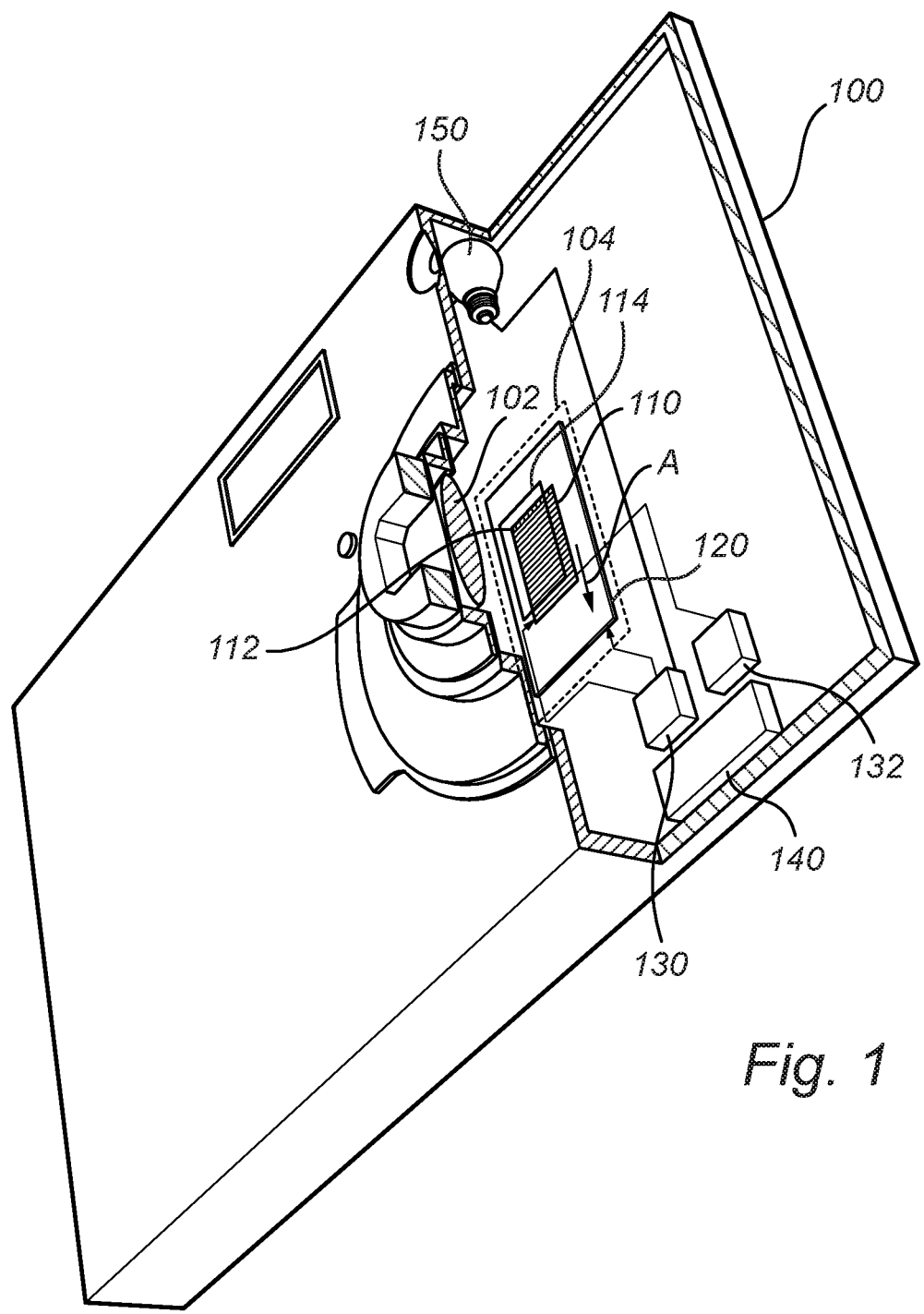
FIG. 1 is a schematic drawing of a device, according to an example embodiment.

Referring now to FIG. 1, a device 100 for acquiring an image having two-dimensional spatial resolution and spectral resolution will be described. The device 100 comprises an optical system 102, which is configured to image an object towards an image plane 104 forming an image circle in the image plane 104.

The optical system 102 may comprise a number of optical components for properly imaging the object, such as apertures, stops, and lenses. The optical system 102 may be adaptable to vary e.g. focus or magnification of the optical system 102.

The device 100 further comprises a sensor surface 110, which may be arranged in the image plane 104 of the optical system. Thus, the optical system 102 may be arranged to direct light from an object towards the sensor surface 110 in the image plane 104.

The device 100 may comprise a plurality of optical systems 102, which may be arranged side-by-side to each form an image circle in a common image plane 104. The optical systems 102 may each have different configurations enabling imaging of an object with different optical set-ups.

As will be further described below, the sensor surface 110 may be movable in the image plane 104. When the device 100 comprises a plurality of optical systems 102, the sensor surface 110 may be movable in the common image plane 104 of the plurality of optical systems 102, such that the sensor surface 110 may in different frames record light that has passed different optical systems 102 and optical set-ups.

The device 100 may further comprise a plurality of sensor surfaces 110, which may be arranged in a common sensor plane. Each sensor surface 110 may be adapted for detection of a specific range of wavelengths, e.g. ultraviolet, visible or infrared light. The plurality of sensor surfaces 110 may thus enable acquiring light over a very broad range of wavelengths, which may be useful for imaging an object with a spectral resolution spanning the broad range of wavelengths.

The plurality of sensor surfaces 110 may be used in combination with a plurality of optical systems 102, such that an object may be imaged with different optical set-ups, while acquiring light over a very broad range of wavelengths.

Although the device 100 may comprise a plurality of optical systems 102 and a plurality of sensor surfaces 110, for simplicity and brevity the device 100 will mainly be described below with reference to a single optical system 102 and a single sensor surface 110. Unless specifically stated below, the features described will also apply to a device 100 comprising a plurality of optical systems 102 and/or a plurality of sensor surfaces 110.

The device 100 may optionally comprise a light source 150 for illuminating the object, in order to provide desired lighting conditions when acquiring an image. The light source 150 may be arranged to provide illumination of specific wavelengths in order for the light to interact with the object, such as being specularly or diffusely reflected or inducing emission of light, such as through fluorescence. The sensor surface 110 may thus be arranged to receive and detect light from the object.

The sensor surface 110 may comprise photo-sensitive areas 112, which may be arranged in columns and rows. The sensor surface 110 may comprise a complementary metal-oxide-semiconductor (CMOS) circuitry for arranging photo-sensitive areas 112 on the surface 110 and circuitry for controlling read-out of detection of light in the photo-sensitive area 112. The photo-sensitive areas 112 may also be referred to as pixels.

The photo-sensitive areas 112 and the circuitry on the sensor surface 110 may together form an image sensor for acquiring frames of image information. Each frame may comprise information of detected incident light in at least a sub-set of rows of photo-sensitive areas 112. The image sensor may further be arranged to acquire a plurality of frames, wherein the plurality of frames may be combined to represent a two-dimensional image of the object having a spectral resolution, as will be described later.

A filter 114 may be integrated on the sensor surface 110. The filter 114 may be arranged to pass specific wavelengths to rows of photo-sensitive areas 112. Thus, the photo-sensitive areas 112 in a row may all be arranged to detect the same wavelengths of light. Further, rows of photo-sensitive areas may be arranged in wavelength bands such that a plurality of rows receives the same wavelengths of light, whereas different wavelength bands receive different wavelengths.

Each wavelength band may define a narrow range of wavelengths which are detected by the photo-sensitive areas 112 in the wavelength band. The wavelength bands may be a plurality of adjacent wavelength bands in a range of wavelengths. However, according to an alternative, the wavelength bands may be a plurality of selected wavelength bands from a range of wavelengths, wherein the wavelength bands are not necessarily adjacent to each other in the wavelength spectrum.

Each wavelength band may define a different, pre-selected wavelength interval, which is detected by the photo-sensitive areas 112 in the wavelength band. The wavelength bands may be adapted to specific requirements, e.g. for facilitating analysis of an object for presence of a compound. The wavelength bands may alternatively comprise a number of adjacent wavelength intervals in a broad range of wavelengths allowing acquiring a two-dimensional image of an object with a spectral resolution facilitating general use of the spectral information.

The sensor surface 110 may be mounted on a translator 120. The translator 120 may thus carry the sensor surface 110 and may accurately control placement of the sensor surface 110 in the image plane 104. The translator 120 may be arranged as a piezo-electric translation stage, which may be accurately controlled in order to provide an accurate placement of the sensor surface 110 in the image plane 104. Thus, the sensor surface 110 may be moved in the image plane 104.

As mentioned above, the filter 114 may be integrated to the sensor surface 110 such that the filter 114 will move with the sensor surface 110 and the same row of photo-sensitive areas 112 will detect the same wavelengths of light regardless of the placement of the sensor surface 110 in the image plane 104. Alternatively, the filter 114 may also be mounted on the translator 120 or connected to the sensor surface 110, such that the filter 114 will move with the sensor surface 110.

The device 100 may further comprise a control unit 130, which may be arranged to control the translator 120 and may further be arranged to control the image sensor to acquire a frame. The control unit 130 may thus be arranged to synchronize movement of the sensor surface 110 and acquiring of frames, as will be further described below.

The control unit 130 may be implemented as a microprocessor, which may be programmable for controlling operation of the microprocessor. For instance, the processing unit may be a central processing unit (CPU). The processing unit may alternatively be a special-purpose circuitry for providing only specific logical operations. Thus, the processing unit may be provided in the form of an application-specific integrated circuit (ASIC), an application-specific instruction-set processor (ASIP) or a field-programmable gate array.

The device 100 may also comprise a combining unit 132 for combining information from a plurality of frames to form multiple channels of an image. The combining unit 132 may be implemented in the same processing unit as the control unit 130 or in another processing unit specially adapted to combining of frames.

It should be realized that one or more of the control unit 130 and the combining unit 132 may alternatively be arranged in an external unit and need not be part of the device 100. The device 100 may thus instead comprise an interface for receiving control signals from an external unit and/or transmitting information in acquired frames to an external unit.

The interface may comprise a communication unit 140 for transmitting and/or receiving information to and from an external unit. The communication unit 140 may be arranged for wired or wireless communication.

In some embodiments, a size of the device 100 may be critical, e.g. if the device 100 is to be used for endoscopic imaging. In such case, the control unit 130 and/or the combining unit 132 may alternatively be arranged in an external unit, such as a personal computer connected to the device 100 such that processing power is arranged externally to the device 100.

The device 100 may be formed in a single housing, such that a relation between the optical system 102 and the translator 120 is well-controlled. This may also ensure that a compact assembly of the device 100 is provided.

Figure 2:
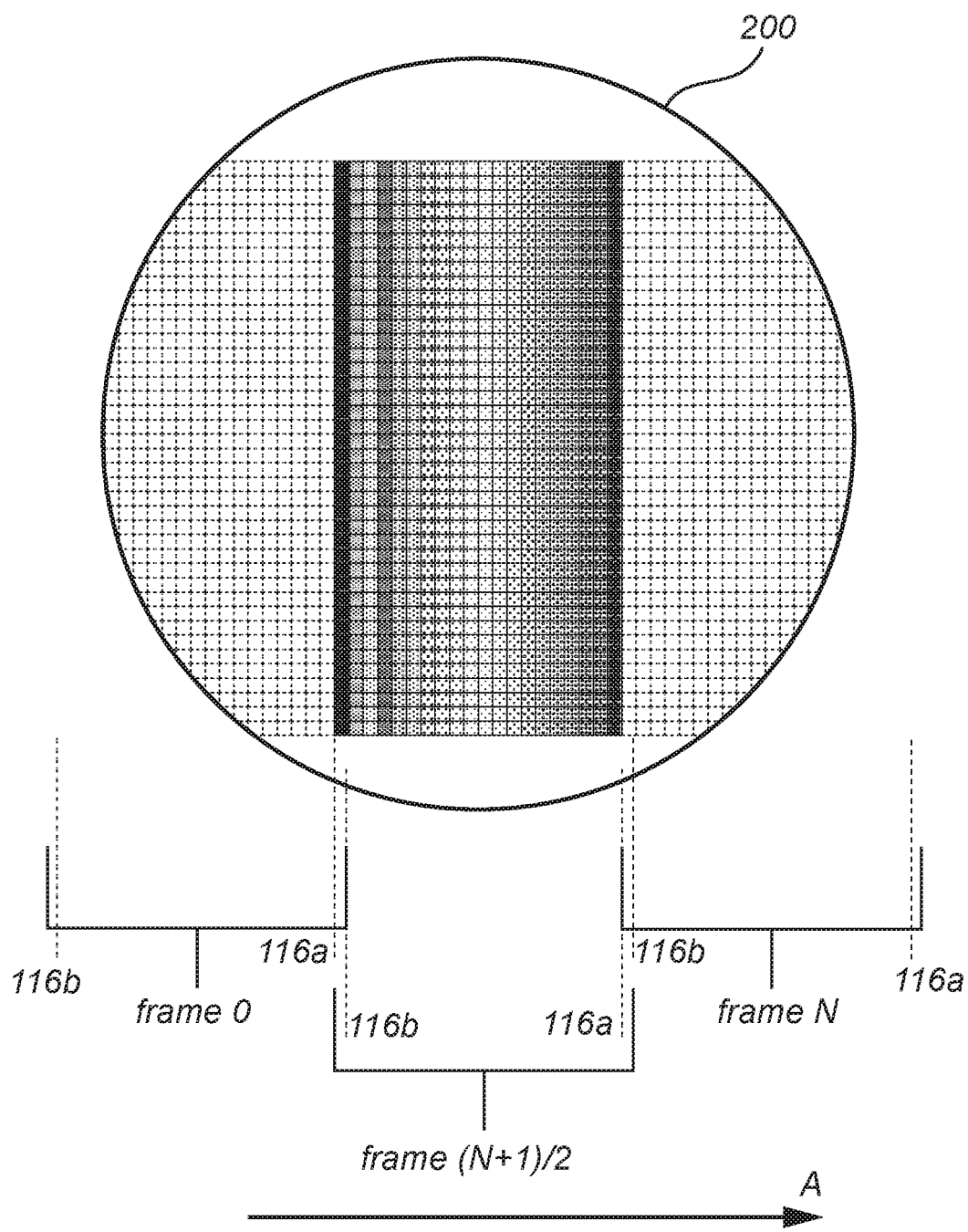
FIG. 2 is a schematic drawing illustrating movement of a sensor surface, according to an example embodiment.

Referring now to FIG. 2, movement of the sensor surface 110 and acquiring of frames will be further explained. FIG. 2 illustrates an image circle 200 projected by the optical system 102 onto the image plane 104. The image circle is scanned by the sensor surface 110.

The sensor surface 110 is moved in a direction perpendicular to a longitudinal direction of the rows of photo-sensitive areas 112, as indicated by arrow A. A plurality of frames is acquired while the sensor surface 110 is moved in the image plane 104. A row of photo-sensitive areas 112 may thus detect incident light in a number of frames, detecting light from different parts of the object in each frame.

The plurality of frames may then be combined to form multiple channels of an image. Each channel may be formed based on detected light in a wavelength band and represent a two-dimensional image of the object for the wavelengths detected in the wavelength band. Together the multiple channels may form a hyperspectral cube, i.e. imaging the object in two spatial dimensions and in a third spectral dimension.

The sensor surface 110 may be tilted in relation to a direction of movement of the sensor surface 110. Hence, a non-zero angle may be formed between a longitudinal direction of columns of the sensor surface 110 and the movement direction A. This implies that different rows of the sensor surface 110 may be arranged at different distances to the optical system 102 and may allow for diminishing errors e.g. due to chromatic aberrations of the optical system 102, which may cause the true image plane 104 to be at different distances from the optical system 102 for different wavelengths of light.

The optical system 102 may also or alternatively be dynamically controlled such that the optical system 102 may be adapted to the wavelengths of light to be recorded in a specific frame in order to diminish errors due to e.g. chromatic aberrations.

As indicated in FIG. 2, a first frame, frame 0, is acquired when the sensor surface 110 is mostly outside the image circle. In FIG. 2, only a single row of photo-sensitive areas 112, namely the row 116a leading the movement of the sensor surface 110 in the scanning direction A, receives light. Then, the sensor surface 110 is moved in the scanning direction A so that the row 116a in sequential frames receives light from different parts of the object. The sensor surface 110 is then gradually moved out of the image circle again until a last frame, frame N, is acquired when the sensor surface 110 is mostly outside the image circle again. In the last frame, only the row 116b trailing the movement in the scanning direction A receives light.

Depending on the optical system 102 and sensor dimensions, a size of the scanned area may vary. However, to obtain a hyperspectral cube of a size of the sensor itself, two times the number of wavelength bands minus one frames need to be acquired, as illustrated in FIG. 2.

As explained above, the device 100 may comprise a plurality of sensor surfaces 110. The plurality of sensor surfaces 110 may thus sequentially scan the image circle, whereby the object may be imaged by the optical system 102 onto a plurality of sensor surfaces 110 for recording different ranges of wavelengths. The recorded frames from the plurality of sensor surfaces 110 may be combined into a large hyperspectral cube spanning a very broad range of wavelengths.

Also, the device 110 may comprise a plurality of optical systems 102. The optical systems 102 may image slightly different parts of an object, e.g. with different optical set-ups. A separate image in the form of a hyperspectral cube may be formed based on each optical system 102.

If the object is moved in relation to the optical systems 102, the same part of the object may be imaged by the plurality of optical systems 102 in sequential imaging sequences.

The plurality of optical systems 102 may be used for imaging in an object with different configurations, varying e.g. apertures, focal length and/or optical filters.

Differences in apertures between the optical systems enable for instance the implementation of a High Dynamic Range image reconstruction. Differences in focal length between the optical systems enable scanning with different magnifications and field of views, as e.g., in a microscopy setup. Different optical filters between the optical systems enable enhancing the spectral quality by avoiding for instance spectral mixing in bands with multiple peaks. The different optical filters would also be needed when scanning with multiple sensor surfaces in different spectral ranges. A plurality of optical systems with different optical axes may enable (multi-) stereo 3D hyperspectral imaging.

The plurality of frames (acquired in relation to a single optical system 102) should be acquired while the object is static, such that motion blur is not introduced into the image.

According to an alternative embodiment, the device 100 is arranged to move in concert with the object, e.g. along a conveyor belt, such that the object appears static in relation to the optical system 102. Thus, the plurality of frames while a same position on the object is imaged onto a same position in the image plane 104, such that no motion blur will be introduced in the acquiring of a plurality of frames.

The device 100 may be used in a start/stop mode, where translation of the sensor surface 110 is halted between frames. Thus, no motion of the sensor surface 110 occurs during acquiring of a single frame and any motion blur may thus be avoided.

However, the device 100 may alternatively be used in a continuous mode. The frames may thus be acquired when the sensor surface 110 is at specific positions in the image plane 104 by providing triggering of the acquiring of a frame in synchronization with a speed of movement of the sensor surface 110. The translator 120 may move the sensor surface 110 with such precision that sub-pixel registration of the frames may be allowed. The speed of movement of the sensor surface 110 may be so low that the sensor surface 110 is not moved a distance longer than a height of a wavelength band during acquisition time. Pixel blur (i.e. a displacement in number of pixels of the sensor surface 110 occurring during image acquisition) may be controlled and the resulting image can be binned to reduce noise.

In either of the above modes movement of the translator 120 needs to be accurately controlled, such that a position of a row of photo-sensitive areas 112 of the sensor surface 110 in the imaging plane 104 is accurately known. In the start/stop mode, the translator 120 may be arranged to move the sensor surface 110 a distance corresponding to a height of an integer number of photo-sensitive areas 112, e.g. corresponding to a size of a wavelength band.

The light source 150 may further be controlled, e.g. by the control unit 130, such that a spectral profile (e.g. a specific wavelength of light) of the emitted light may match a sensitivity of the rows 116 of the sensor surface 110 which are arranged in the image circle.

By the light source 150 being controlled by the control unit 130, synchronization of the emitted light with the movement of the sensor surface 110 may be facilitated. However, it should be realized that the light source 150 may be controlled by a separate controller, e.g. embedded in the light source 150.

In one embodiment, the light source 150 may be controlled to change the spectral profile at each frame to be acquired. The light source 150 may thus be tuned to specifically match a quantum efficiency and spectral range of each wavelength band that passes the image circle. Alternatively, the light source 150 may be controlled to change the spectral profile one or a few times during scanning of the sensor surface 110 over the image circle to adjust to a continuous change of sensitivity of the wavelength bands in the image circle.

In one embodiment, the light source 150 may be controlled to change in relation to different sensor surfaces 110 being arranged in the image circle. For instance, if a first sensor surface 110 is arranged to detect ultraviolet light and a second sensor surface 110 is arranged to detect visible light, the light source 150 may be controlled to emit ultraviolet light when the first sensor surface 110 is in the image circle and to emit visible light when the second sensor surface 110 is in the image circle.

In another embodiment, the light source 150 may be controlled to change the illumination for different passes of the sensor surface 110 over the image circle. For instance, a broadband visible light illumination may first be used in a first scan of the sensor surface 110 over the image circle. Then, an illumination for inducing fluorescence may be used in a second scan allowing acquiring a first image of an object in visible light and a second fluorescence image of the object. This may be very useful in some applications, such as fluorescence guided surgery, where fluorescence localization algorithms require intrinsic measurements (at the excitation wavelength) and fluorescence measurements.

Referring now to FIGS. 3-6, two examples of movement of the sensor surface 110 and the combination of frames into an image having spectral resolution will be given. The movement between subsequent frames is called a step-size and is quantified as the number of pixels to which the movement corresponds.

Figure 3:
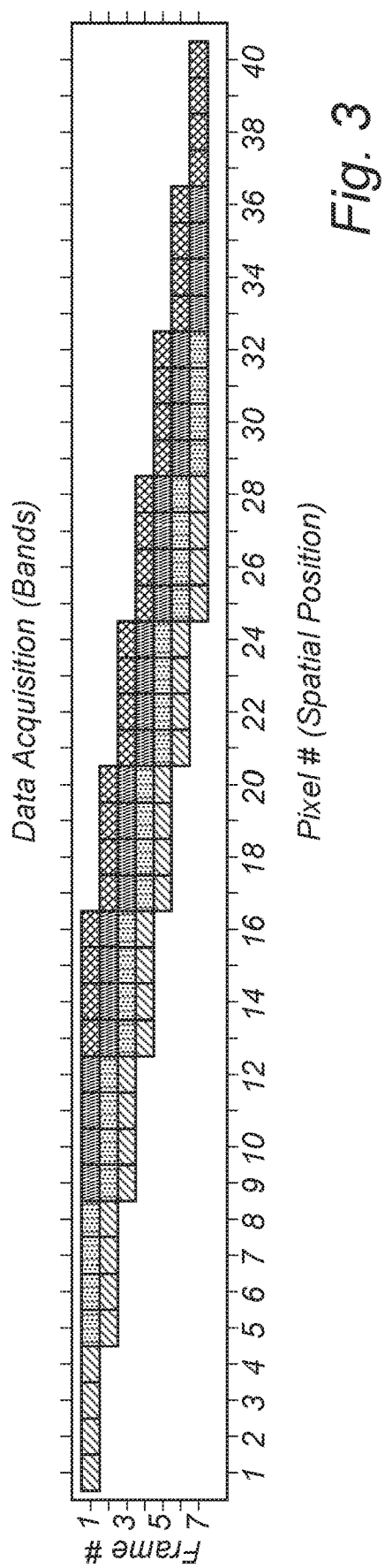
FIG. 3 is a schematic drawing illustrating information acquired in different frames, according to an example embodiment.
Figure 4:
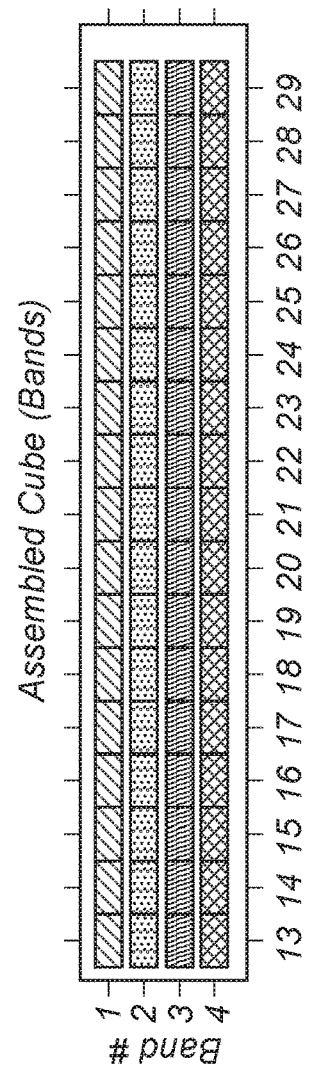
FIG. 4 is a schematic drawing illustrating an image having two-dimensional spatial resolution and spectral resolution being formed based on the information acquired in the frames of FIG. 3.

In a first example, illustrated in FIGS. 3-4, the sensor surface 110 comprises 4 wavelength bands, each comprising 4 rows of pixels. The sensor surface 110 is moved using a 4 pixel step between frames. In this case, 7 frames are acquired in order to complete a data set for forming four channels each representing a two-dimensional image of the object for a specific wavelength band.

It is clear from FIG. 3 that only pixel positions 13-28 contain all spectral bands and a combined image may thus be formed, as illustrated in FIG. 4, for these pixel positions. The combined image comprises spectral information of four different wavelength bands for every spatial position in the image and the combined image is as large as the size of the image sensor.

Figure 5:
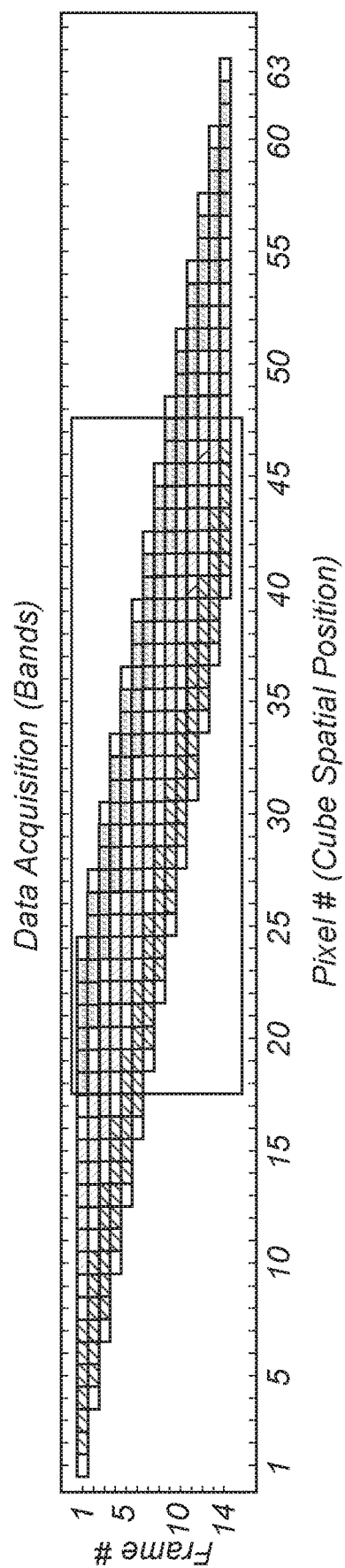
FIG. 5 is a schematic drawing illustrating information acquired in different frames, according to an example embodiment.
Figure 6:
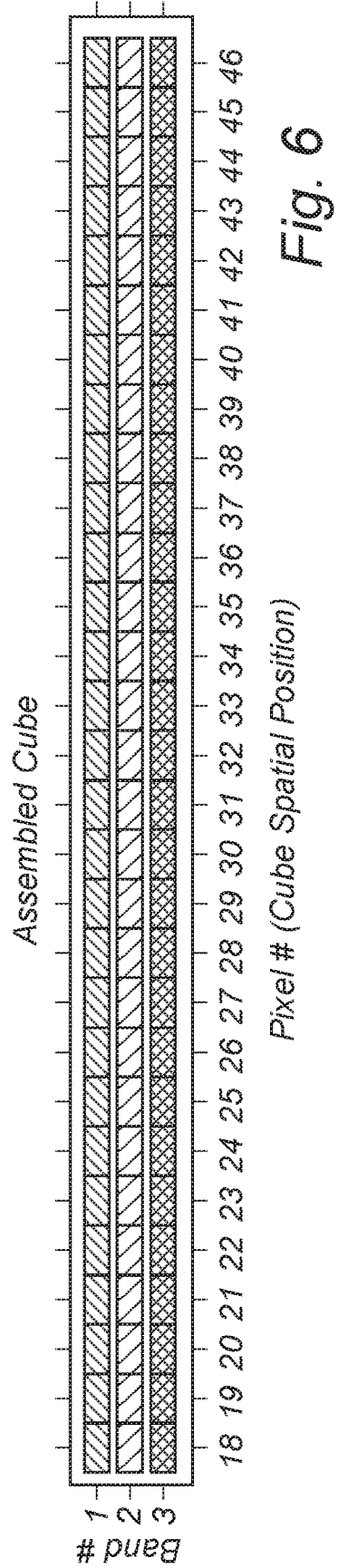
FIG. 6 is a schematic drawing illustrating an image having two-dimensional spatial resolution and spectral resolution being formed based on the information acquired in the frames of FIG. 5.

In the example of FIGS. 5-6, the sensor surface 110 comprises 3 wavelength bands, each comprising 8 rows of pixels. The sensor surface 110 is moved using a 3 pixel step between frames. Here, 14 frames are acquired as illustrated in FIG. 5.

Since each wavelength band comprises 8 rows of pixels, and a 3 pixel step is used, a spatial position of the object is imaged in a single wavelength band in a plurality of frames. This allows pixels at the edge of each band to be discarded, in order to avoid cross-talk between adjacent wavelength bands. Further, information relating to each spatial position is still acquired in two frames for each wavelength band. Information from a plurality of frames may be combined in several different ways. For instance, an average of the detected incident light in the plurality of frames may be used. Alternatively, a median value, a minimum value, a maximum value or a percentile value may be used.

It should be realized that the above examples described in relation to FIGS. 3-6 are given in order to facilitate explanation of how a plurality of frames may be acquired and are related to each other. In practical examples, the size of the sensor surface 110 is larger and a larger number of wavelength bands may be used.

In one embodiment, a sensor surface 110 comprises 128 wavelength bands of 8 pixels each (1024 pixel rows) by 2048 columns. The device 100 may then be arranged to acquire 255 frames using an 8 pixel step. Each pixel may have a height of 5.5 µm, which implies that the sensor surface will in total be moved 11.22 mm. The sensor can be operated at acquiring 350 frames per second, such that a full hyperspectral cube (1024×2048 pixels×128 wavelength bands) may be acquired in 0.72 seconds. Thus, the full hyperspectral cube may be quickly obtained, which does not set very limiting requirements on having a static object in relation to the optical system 102.

The wavelength bands on the sensor surface 110 may be designed with different widths (different number of rows per wavelength band). This may be used for adjusting a signal-to-noise ratio depending on quantum efficiency of the photo-sensitive areas 112 and filter response.

A set of adjacent wavelength bands define a spectral range that may be acquired by the sensor surface 110. According to an embodiment, the sensor surface 110 comprises a plurality of sets of wavelength bands repeated on the sensor surface 110.

For instance, a sensor surface 110 may have 128 different wavelength bands, each covering 8 rows of the sensor surface 110. By repeating the sets of wavelength bands on a same-size sensor surface 110, the sensor surface 110 may instead have two times the same 128 bands each covering 4 rows of the sensor surface 110. Then, in order to acquire an image spectrally resolved over the 128 band, it is only necessary to move the sensor surface 110 half the distance. Thus, a rate of acquired images may be increased, in particular if the sensor surface 110 is moved in continuous mode.

Further, since the wavelength bands are repeated on the sensor surface 110, acquiring of a subsequent image may be initiated while a current image is acquired. For instance, with reference to FIG. 3, while frames 5-7 are acquired for a current image, frames 1-3 for the subsequent image may be acquired. This implies that the subsequent image may be acquired quickly after the acquiring of the current image.

According to an embodiment, an image may be acquired when the sensor surface 110 is moved in a first direction over the image circle. Once the entire sensor surface 110 has been scanned, another image may be acquired while the sensor surface 110 is moved back over the image circle in a second direction opposite the first direction. Thus, images may be acquired as the translator 120 moves the sensor surface 110 back and forth over the image circle. The wavelength band leading the movement of the sensor surface 110 in the first direction will be trailing the movement of the sensor surface 110 in the second direction. This implies that an order of acquiring information relating to different wavelength bands will be changed between the first and second direction. However, this may be easily handled when combining frames into an image having spectral resolution.

Using a plurality of sets of wavelength bands repeated on the sensor surface 110 and acquiring images when moving the translator 120 in both the first direction and the opposite second direction may be used for acquiring images having a full spectral resolution at a very high rate. This may be used in order to acquire video-type imaging of an object or a scene with a high spectral resolution. For instance, using a sensor surface 110 having 64 wavelength bands, each of one row, repeated 8 times on the sensor surface 110, and scanning back and forth may result in a rate of about 10 images per second.

Figure 7:
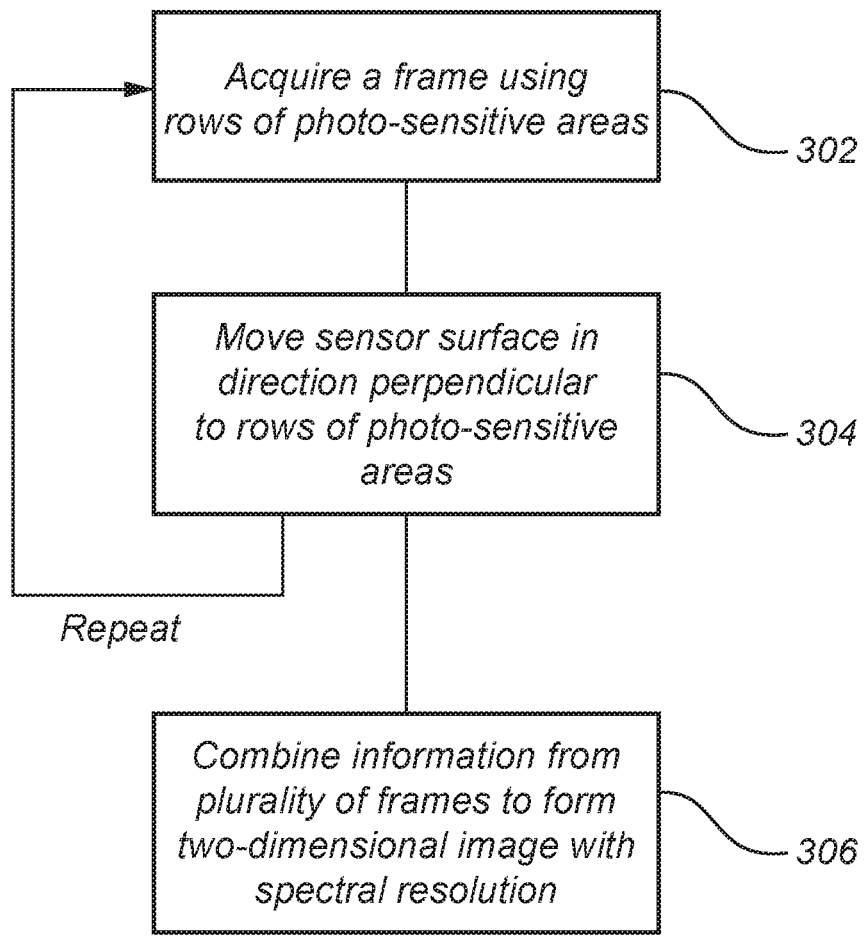
FIG. 7 is a flow chart of a method, according to an example embodiment.

Referring now to FIG. 7, a method 300 for acquiring an image will be described. The method comprises acquiring, step 302, a frame using rows of photo-sensitive areas 112 on a sensor surface 110. The method further comprises moving, step 304, the sensor surface 110 in the image plane 104 in a direction perpendicular to a longitudinal direction of the rows of photo-sensitive areas 112. The acquiring 302 of a frame is repeated for acquiring a plurality of frames, wherein the sensor surface 110 is differently arranged to the optical system 102 for different frames. Thus, different spectral information for respective positions on the object is recorded based on the sensor surface 110 in different frames.

Then, information from the thus-acquired plurality of frames are combined, step 306, to form multiple channels of an image, wherein each channel is formed based on detected light in respective rows of photo-sensitive areas 112 and represent a two-dimensional image of the object for a different wavelength interval.

Optionally, before initiating combining of a plurality of frames, a check may be performed whether the sensor surface 110 has been scanned over the entire surface to be scanned (e.g. over all wavelength bands), so that each spatial position of an object has been imaged onto each wavelength band on the sensor surface 110. If not, the repeating of the step 302 for acquiring a plurality of frames using different positions of the sensor surface 110 in relation to the optical system 102 may be continued in order to obtain further frames before combining of a plurality of frames is initiated.

If the check finds that the desired frames have been acquired, the combining 306 of information from the thus-acquired plurality of frames may be initiated.

It should be realized, however, that the step 306 of combining plurality of frames to form multiple channels of an image may be initiated before all frames have been acquired. Also, an image may be formed even if all frames are, for some reason, not acquired. Hence, if the check never finds that the entire surface to be scanned has actually been scanned, the step 306 may still be performed based on the frames that have been acquired to form an image which may lack information of some of the multiple channels.

In the above, the disclosure has mainly been described with reference to a limited number of embodiments. However, as is readily appreciated by a person skilled in the art, other embodiments than the ones disclosed above are equally possible within the scope of the disclosure, as defined by the appended claims.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A camera for acquiring a hyperspectral image having two-dimensional spatial resolution comprising:
   at least one optical system, wherein each optical system of the at least one optical system is configured to define an image plane and direct light from an object towards the image plane;
   at least one sensor surface comprising photo-sensitive areas for detecting incident light from one or more parts of the object, wherein the photo-sensitive areas are arranged to receive and detect the light from the object;
   at least one filter comprising a filter response that defines a plurality of wavelength bands, wherein the at least one filter is arranged in relation to the at least one sensor surface such that each wavelength band spatially corresponds to one or more rows of photo-sensitive areas;
   a translator, wherein the translator is configured to move the at least one sensor surface (i) in the image plane in a direction perpendicular to a longitudinal direction of the rows of photo-sensitive area and (ii) at a distance corresponding to a height of photo-sensitive areas spatially corresponding to a respective wavelength band;
   the translator being configured for synchronized movement of the at least one sensor surface with acquiring of a plurality of frames, wherein a frame in the plurality of frames is acquired by arranging a sub-set of the rows of photo-sensitive areas in the image plane to receive incident light from the at least one optical system; and
   a combining unit for combining information from a plurality of frames to form multiple channels of an image and to represent a two-dimensional hyperspectral image of the object, wherein each channel is formed based on detected light in respective rows of photo-sensitive areas.

2. The camera according to claim 1, wherein a number of the one or more rows of photo-sensitive areas spatially corresponding to a given wavelength band is different for different wavelength bands.

3. The camera according to claim 1, wherein a set of adjacent wavelength bands define a spectral range of an image, and wherein the at least one sensor surface comprises a plurality of sets of wavelength bands repeated on the at least one sensor surface.

4. The camera according to claim 1, further comprising a plurality of sensor surfaces, wherein the plurality of sensor surfaces are arranged in a common sensor plane and the translator is arranged to carry the common sensor plane including the plurality of sensor surfaces.

5. The camera according to claim 1, further comprising a plurality of optical systems, wherein each optical system in the plurality of optical systems is configured to define an image circle on an image plane and wherein a plurality of image circles are defined on a common image plane.

6. The camera according to claim 1, wherein the at least one sensor surface is tilted in relation to a direction of movement of the at least one sensor surface by the translator carrying the at least one sensor surface.

7. The camera according to claim 1, wherein the camera is arranged to acquire a first set of frames for forming a first image having two-dimensional spatial resolution and first spectral information while moving the translator in a first direction and acquire a second set of frames for forming a second image having two-dimensional spatial resolution and second spectral information while moving the translator in a second direction opposite to the first direction.

8. The camera according to claim 1, further comprising an illumination source, wherein the illumination source is controllable for controlling a spectral profile of illuminated light.

9. The camera according to claim 1, wherein the translator is configured to move the at least one sensor surface a distance corresponding to a height of an integer number of photo-sensitive areas, wherein the integer number of photo-sensitive areas is less than a number of rows spatially corresponding to a given wavelength band.

* * * * *